(12) United States Patent
Baldwin et al.

(10) Patent No.: US 9,455,556 B1
(45) Date of Patent: Sep. 27, 2016

(54) CABLE CONDUIT TRANSITIONS

(71) Applicants: Jeffrey Baldwin, Desert Hills, AZ (US); John Klein, Gilbert, AZ (US); Ryan Liebengood, Gilbert, AZ (US)

(72) Inventors: Jeffrey Baldwin, Desert Hills, AZ (US); John Klein, Gilbert, AZ (US); Ryan Liebengood, Gilbert, AZ (US)

( * ) Notice: Subject to any disclaimer, the term of this patent is extended or adjusted under 35 U.S.C. 154(b) by 0 days.

(21) Appl. No.: 14/790,413

(22) Filed: Jul. 2, 2015

Related U.S. Application Data

(60) Provisional application No. 62/021,086, filed on Jul. 4, 2014.

(51) Int. Cl.
*H02G 3/04* (2006.01)

(52) U.S. Cl.
CPC .................................. *H02G 3/0406* (2013.01)

(58) Field of Classification Search
USPC ................. 174/68.3, 504, 101, 117 A, 72 C
See application file for complete search history.

(56) References Cited

U.S. PATENT DOCUMENTS

| | | | | |
|---|---|---|---|---|
| 3,171,702 A * | 3/1965 | Schumacher | .......... | H02G 3/128 174/101 |
| 4,454,374 A * | 6/1984 | Pollack | .................... | H02G 3/04 174/117 A |
| 4,530,865 A * | 7/1985 | Sprenger | ................. | E04F 19/04 138/111 |
| 4,563,542 A * | 1/1986 | Pollack | ................... | H02G 3/266 174/68.3 |
| 4,589,449 A * | 5/1986 | Bramwell | ............ | H02G 3/0608 138/157 |
| RE32,820 E * | 1/1989 | Pollack | ................ | H02G 3/0431 174/68.3 |
| 8,729,408 B2 * | 5/2014 | Pawlak | ................... | E04F 19/04 174/504 |

* cited by examiner

*Primary Examiner* — Michael F McAllister
(74) *Attorney, Agent, or Firm* — Ryan Liebengood

(57) ABSTRACT

A cable conduit transition including a longitudinal axis, a lower portion having a semicircular shape around the longitudinal axis and two lower portion terminating ends, an upper portion having a semicircular shape around the longitudinal axis and two upper portion terminating ends, and wherein the two lower portion terminating ends are offset from the two upper portion terminating ends.

19 Claims, 7 Drawing Sheets

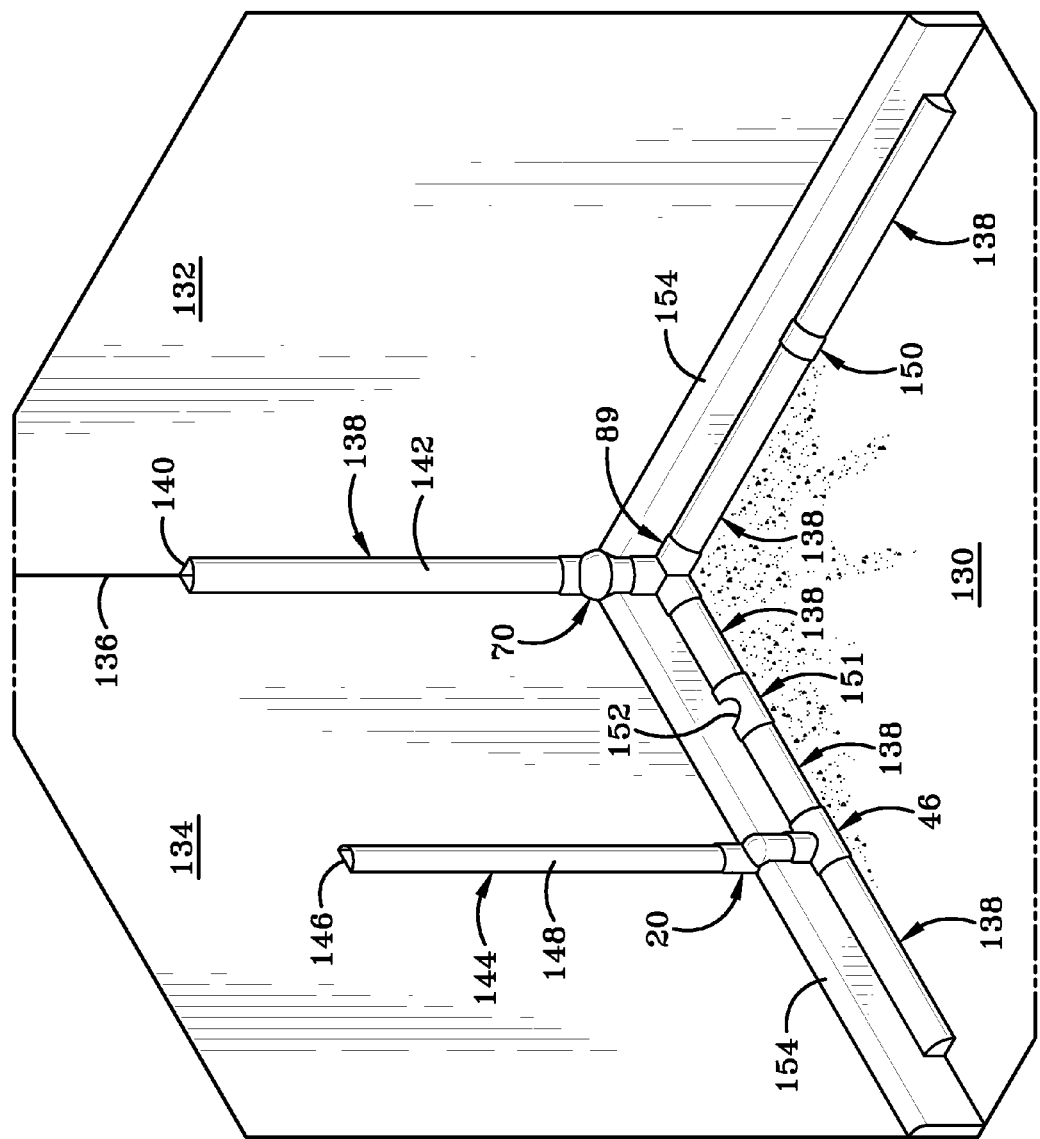

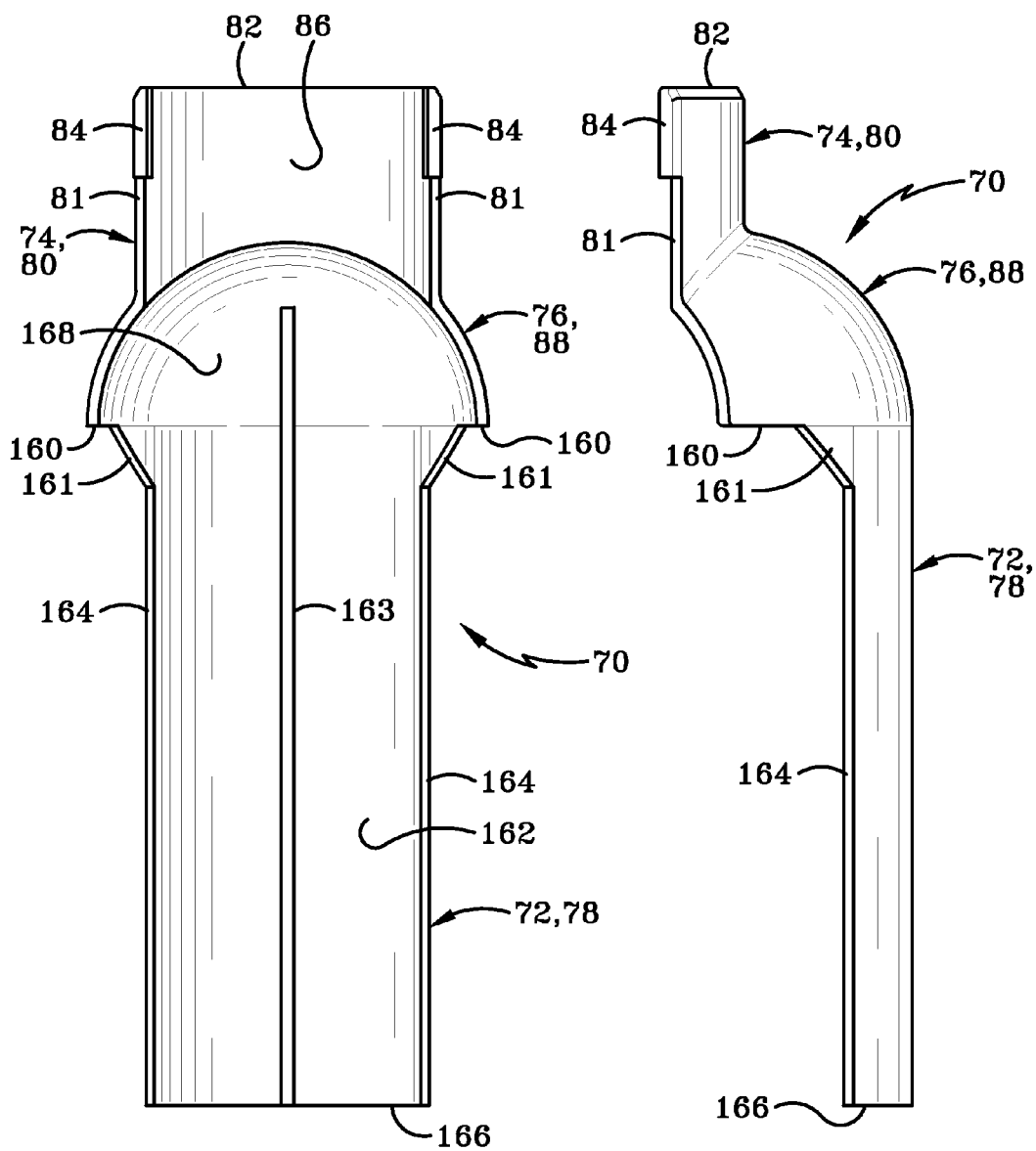

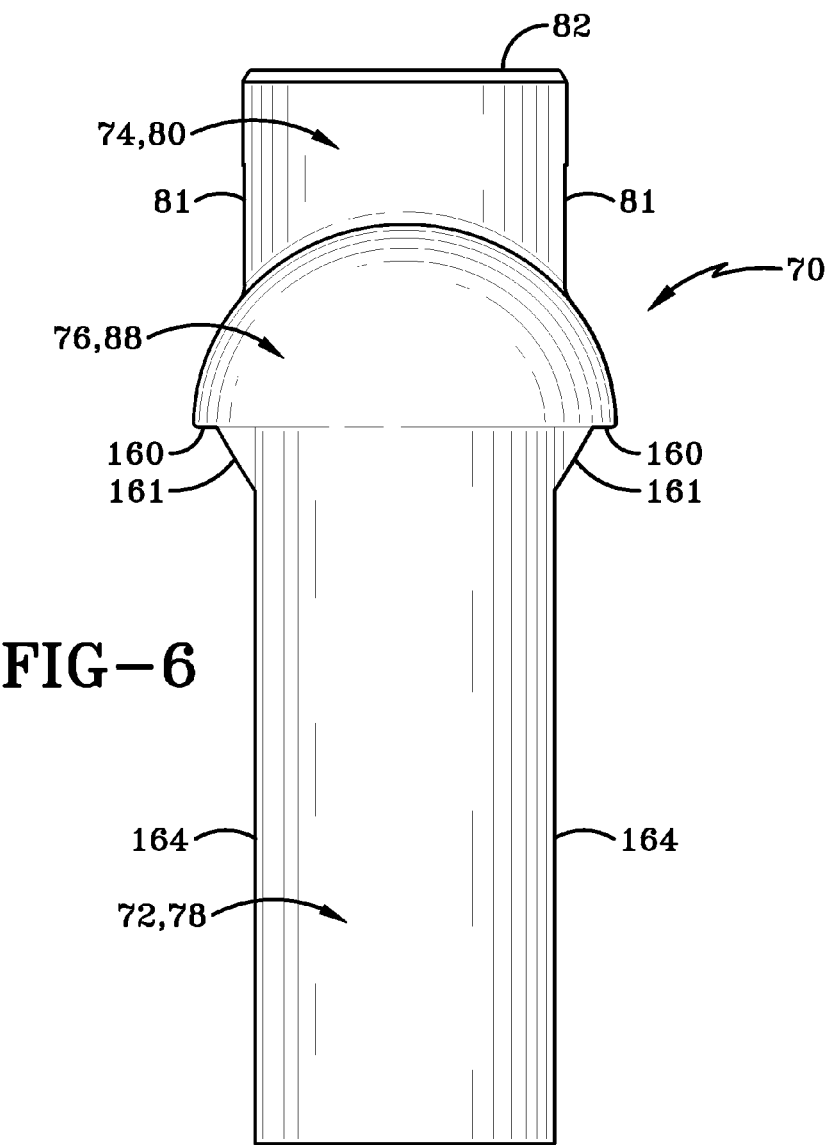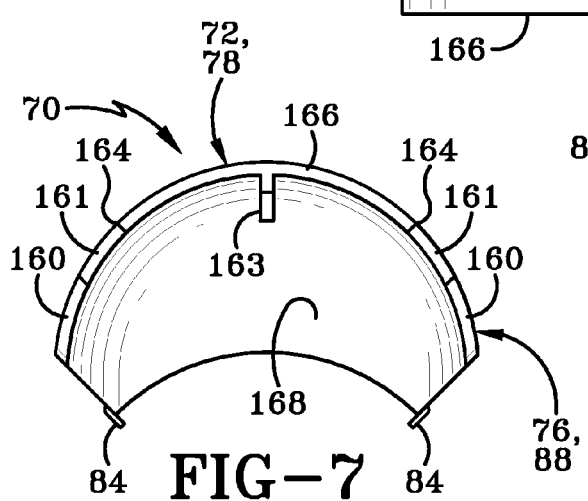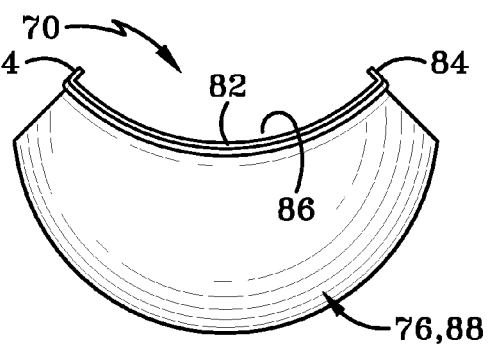

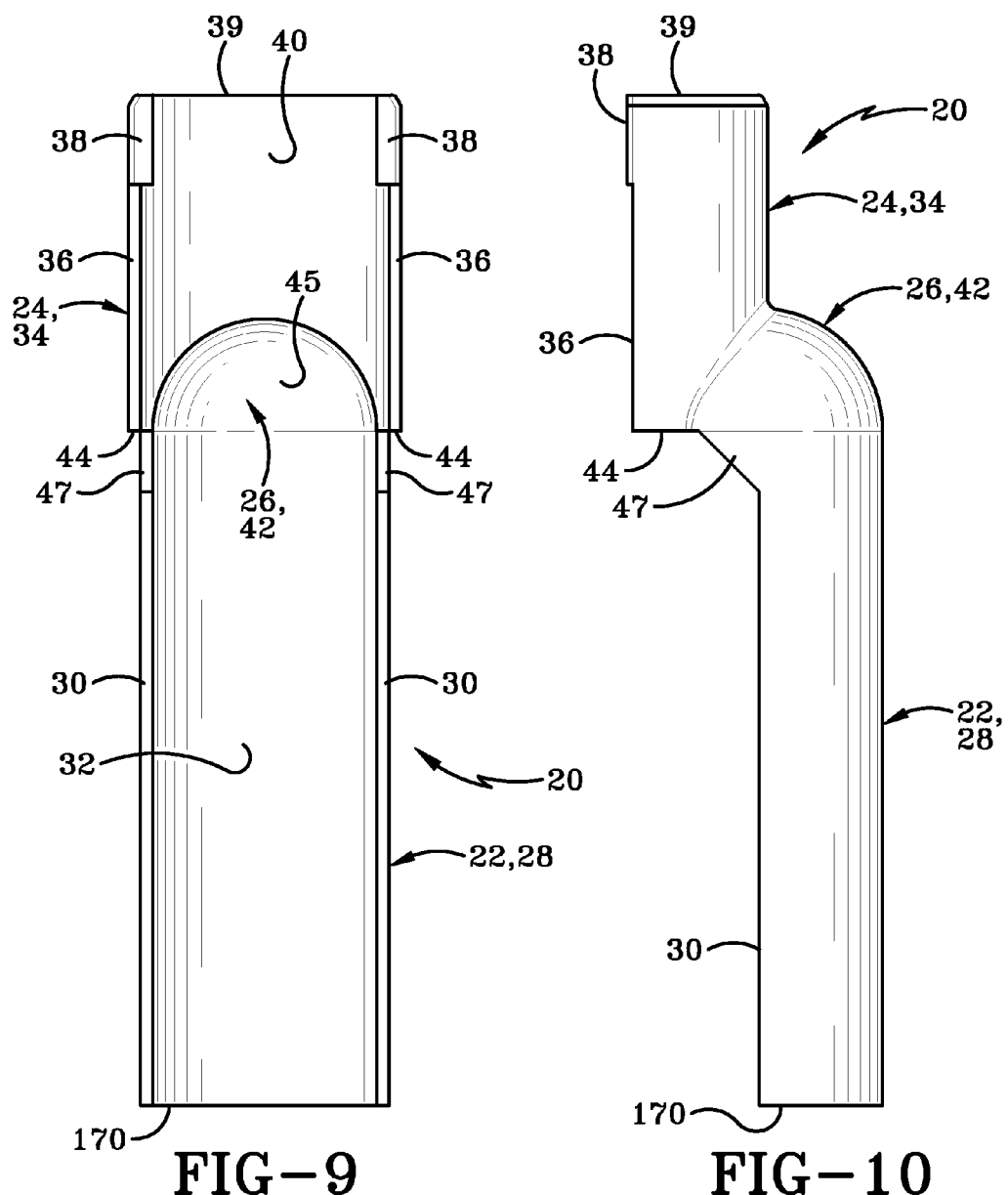

CABLE CONDUIT TRANSITIONS

CROSS-REFERENCE TO RELATED APPLICATIONS

This application claims priority to U.S. Provisional Application No. 62/021,086 entitled CONDUIT TRANSITIONS to Baldwin et al., filed on Jul. 4, 2014, the disclosure of which is hereby incorporated herein by reference.

BACKGROUND

1. Technical Field

Aspects of the present disclosure relate generally to cable conduits and more specifically to cable conduits which hides line voltage cables and low voltage cables on a wall for a more aesthetically pleasing appearance.

2. Background Art

Electrical cords and plugs are well known and are used to provide electrical current to a number of devices. Modern televisions are light enough to be hung on the wall, yet still need to be connected to an electrical outlet. In new construction, an electrical outlet can be located where a television will ultimately be mounted, yet the majority of households have electrical outlets near the floor. In these instances, the television electrical cable droops from the mounted television to reach the electrical outlet near the floor and creates an unsightly appearance. Further, DVD players, cable boxes, and similar devices which play through the television must be connected to the television with an HDMI cable or other suitable cable. These cables then must be run up the wall and further clutters the television's appearance. Still further, speaker wires and other cables may need to be routed throughout a room with the least impact to a room's aesthetics.

SUMMARY

Aspects of this disclosure relate to cable conduit transitions. A cable conduit transition may include a longitudinal axis, a lower portion having a semicircular shape around the longitudinal axis and two lower portion terminating ends, an upper portion having a semicircular shape around the longitudinal axis and two upper portion terminating ends, and wherein the two lower portion terminating ends are offset from the two upper portion terminating ends.

In an implementation, the two lower portion terminating ends and the two upper portion terminating ends may be oriented approximately 180 degrees apart. The two lower portion terminating ends and the two upper portion terminating ends may be oriented approximately 90 degrees apart. The two upper portion terminating ends may further include retaining tabs. The cable conduit transition may further include a middle portion having a spherical shape and connecting the upper portion and the lower portion.

The lower portion, the upper portion, and the middle portion may together define a passage. The two lower portion terminating ends and a bottom wall of the middle portion may abut a baseboard. The two upper portion terminating ends may abut a wall. The upper portion may surround a cable conduit. The two upper portion terminating ends may further include retaining tabs and the retaining tabs may engage the cable conduit. The upper portion may removably surround the cable conduit. A cable conduit connector may connect at least two cable conduits. The cable conduit connector may further include a neck.

The lower portion may be removably positioned within the neck. The cable conduit connector may further include a plurality of retaining tabs. The lower portion may be inserted into the neck until a middle portion contacts a baseboard. The cable conduit connector may further include a first inlet and a second inlet. The first inlet may be oriented generally perpendicular to the second inlet. The first inlet may be oriented parallel to the second inlet. The cable conduit connector may be non-removably connected to the cable conduit transition.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Embodiments of the present disclosure will hereinafter be described in conjunction with the appended drawings, where like designations denote like elements, and:

FIG. 3 is a perspective view of a room with a cable conduit transition, a quarter round cable conduit, and multiple cable conduits.

FIG. 4 is a rear view of the corner cable conduit transition.

FIG. 5 is a left view of the corner cable conduit transition.

FIG. 6 is a front view of the corner cable conduit transition.

FIG. 7 is a bottom view of the corner cable conduit transition.

FIG. 8 is a top view of the corner cable conduit transition.

FIG. 9 is a rear view of the cable conduit transition.

FIG. 10 is a left view of the cable conduit transition.

DETAILED DESCRIPTION

This disclosure, its aspects and implementations, are not limited to the specific components or assembly procedures disclosed herein. Many additional components and assembly procedures known in the art consistent with the intended operation and assembly procedures for a cable conduit transition will become apparent for use with implementations of a cable conduit transition from this disclosure. Accordingly, for example, although particular components are disclosed, such components and other implementing components may comprise any shape, size, style, type, model, version, measurement, concentration, material, quantity, and/or the like as is known in the art for such implementing components, consistent with the intended operation of a cable conduit transition.

Figure 1:
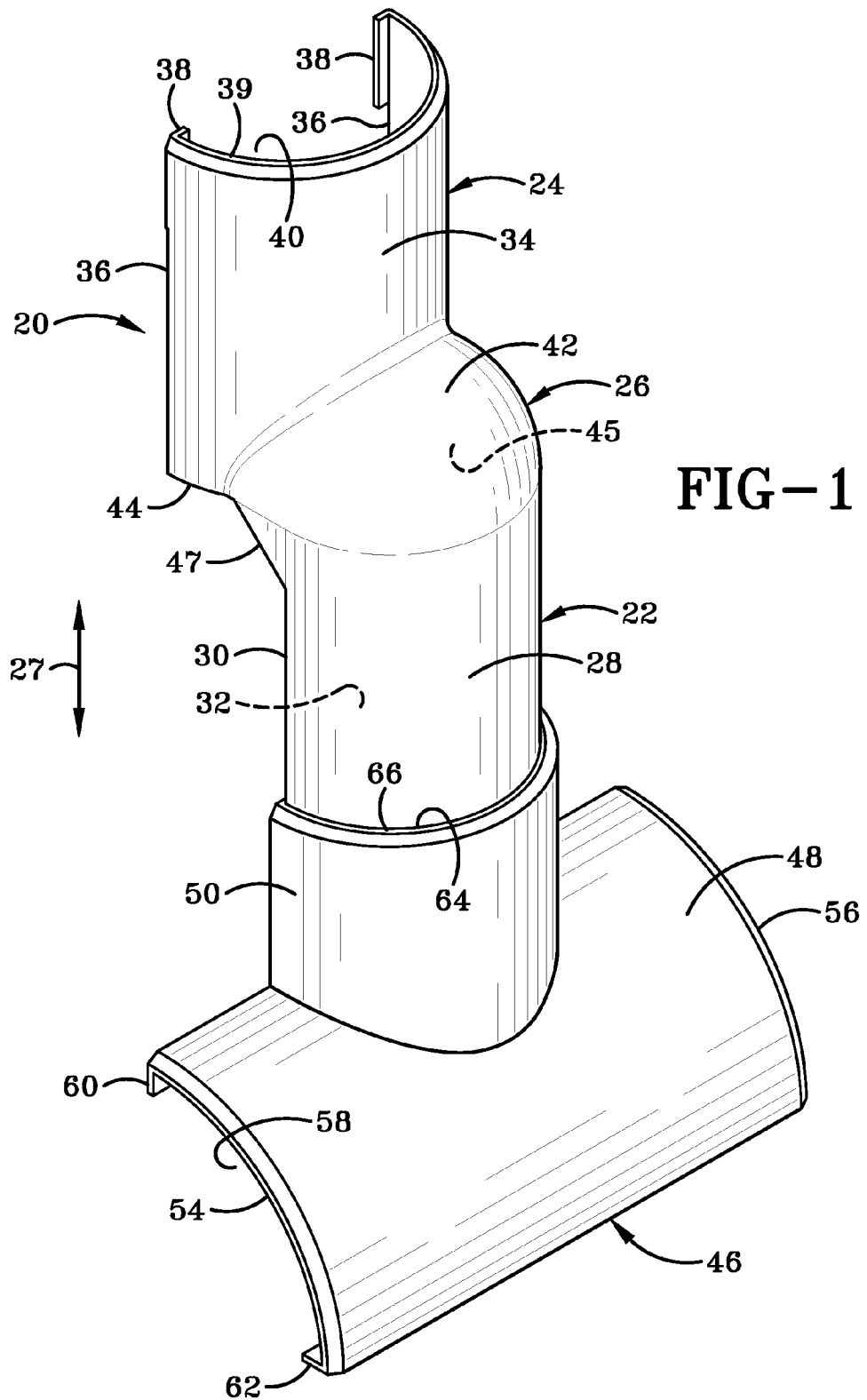
FIG. 1 is a perspective view of a cable conduit transition.
Figure 2:
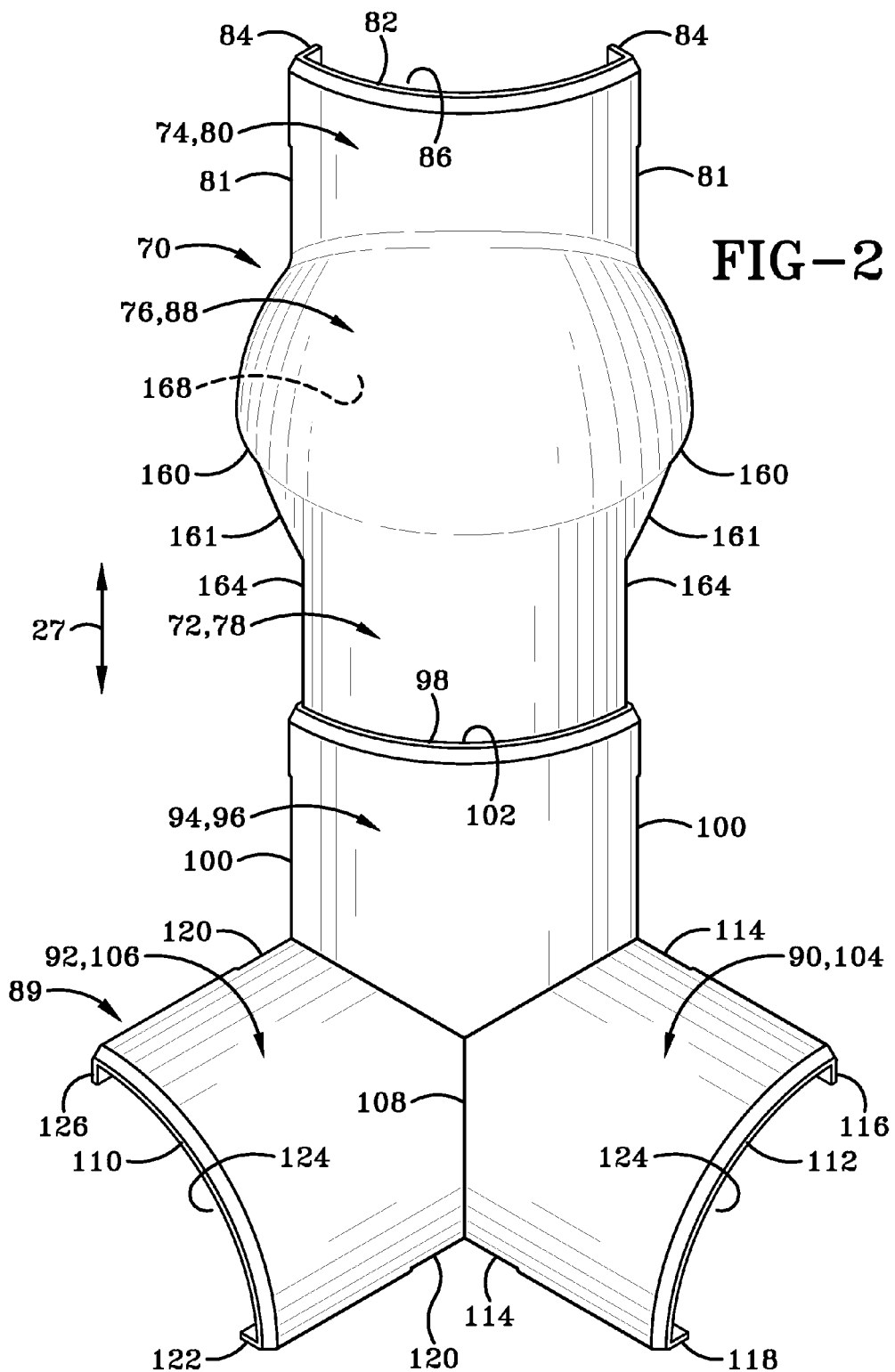
FIG. 2 is a perspective view of a corner cable conduit transition.
Figure 11:
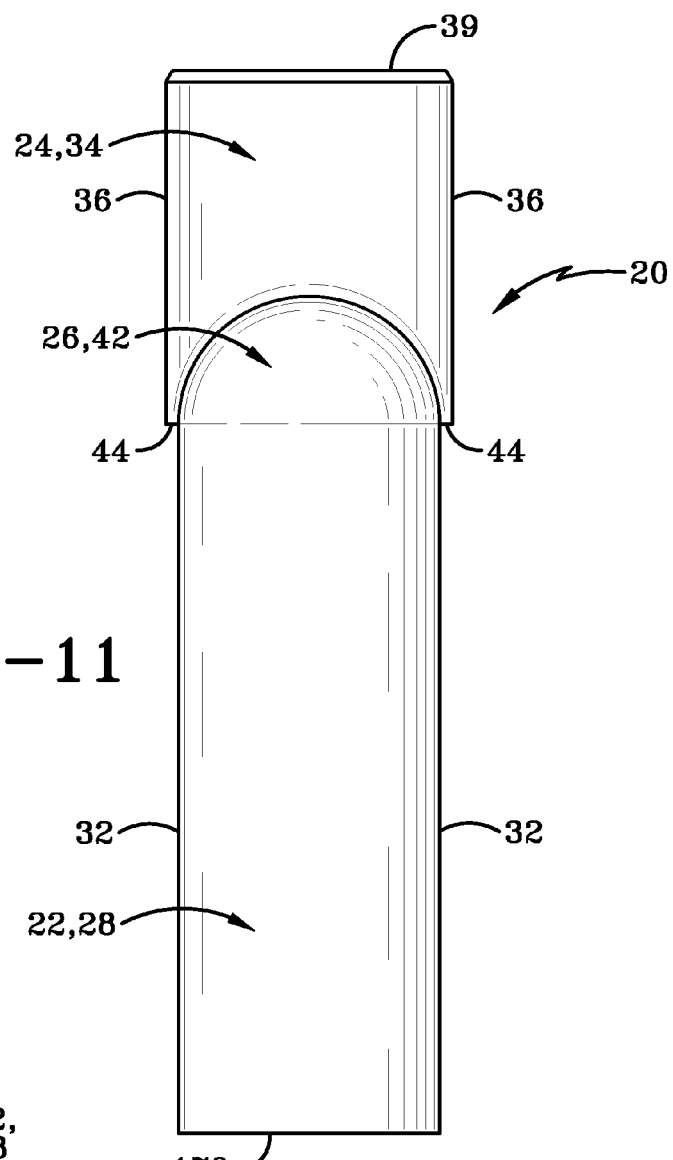
FIG. 11 is a front view of the cable conduit transition.
Figure 12:
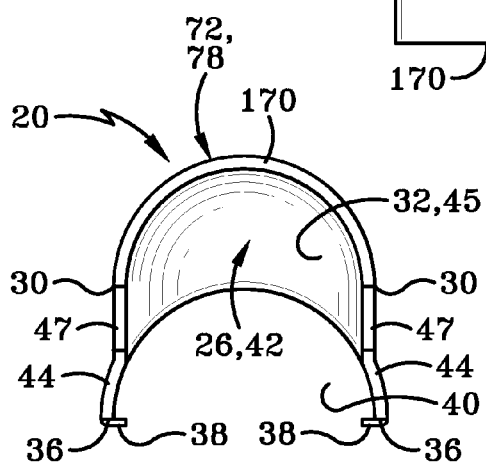
FIG. 12 is a bottom view of the cable conduit transition.
Figure 13:
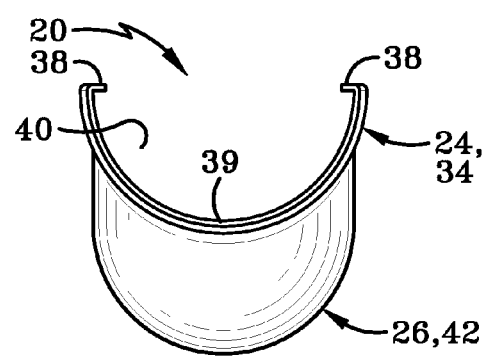
FIG. 13 is a top view of the cable conduit transition.

FIGS. 1-3 illustrate operational views of cable conduit transition 20 and corner cable conduit transition 70 separated from and installed in a room. Specifically, FIGS. 1 and 9-13 illustrate cable conduit transition 20 connected to a cable conduit connector 46 and separated from the cable conduit connector 46. FIGS. 2 and 4-8 illustrate corner cable conduit transition 70 connected to a corner cable conduit connector 89 and separated from the corner cable conduit connector 89.

Referring now to FIGS. 1 and 9-13, cable conduit transition 20 includes a lower portion 22, an upper portion 24, and a middle portion 26 which connects the upper and lower portions. Lower portion 22 includes a rounded body 28 which may be semicircular in shape around a longitudinal axis 27 and ending at terminating ends 30 to form a passage or cavity 32 formed bay an inner surface of body 28 and terminating ends 30. Upper portion 24 includes a rounded body 34 having a top surface 39 and terminating ends 36 which together with body 34 define a passage or cavity 40 about longitudinal axis 27. Terminating ends 36 may also include retaining tabs 38 which are capable of griping a cable conduit to assist with positioning the cable conduit and cable conduit transition 20. In this arrangement, terminating ends 36 are generally offset from terminating ends 30 such that terminating ends 30 contact a baseboard which is secured to a wall, while terminating ends 36 contact the wall as will be described in greater detail below.

Middle portion 26 includes a body 42 which may be rounded or semicircular in shape with a bottom surface 44 and a fillet wall 47 which together define a passage or cavity 45 there between. Bottom surface 44 is used to rest on or contact a top surface of the baseboard, while cavity 45 is open and connects with cavity 40 and cavity 32 such that cable can pass through cavity 32, cavity 45, and cavity 40 to hide the cables within the cable conduit transition 20 before moving into another cable conduit.

Cable conduit transition 20 may be inserted into cable conduit connector 46 within passage or cavity 64 which is formed as part of neck 50. Neck 50 extends upward from body 48 and terminates at top wall 66. A first terminating end 54 and a second terminating end 56 may define the perimeter of cable conduit connector 46 and a cavity or passage 58 is located on an underside of body 48 between the first and second terminating ends. Retaining tabs 60 and 62 may extend from body 48 and function to grip or connect with other cable conduits to ensure a tight and engaged connection. Accordingly, cable may pass through cable conduit connector 46, up cavity 64 and into cavity 32, cavity 45, and cavity 40. Still further, cable conduit transition 20 may also include a terminating end 170 the bottom of lower portion 22 as best seen in FIGS. 9-13. Advantageously, terminating end 170 can be selectively positioned within neck 50 depending on the overall height of baseboard 154. Accordingly, a shorter baseboard 154 means that terminating end 170 will be positioned deeper in neck 50, while a taller baseboard 154 means that terminating end 170 may be positioned wholly within neck 50 and not rest within cable conduit connector 46.

Moving now to FIGS. 2 and 4-8, corner cable conduit transition 70 includes a lower portion 72, an upper portion 74, and a middle portion 76 which connects the lower portion 72 and upper portion 74. Lower portion 72 includes a rounded body 78 which may be semicircular in shape around a longitudinal axis 27 and ending at terminating ends 164 to form a passage or cavity 162 formed by an inner surface of body 78 from terminating end 166 to middle portion 76. Upper portion 74 includes a rounded body 80 having a top surface 82 and terminating ends 81 which together with body 78 define a passage or cavity 86 about longitudinal axis 27. Terminating ends 81 may also include retaining tabs 84 which are capable of griping a cable conduit to assist with positioning the cable conduit and cable conduit transition 70. In this arrangement, terminating ends 81 are generally offset from terminating ends 164 such that terminating ends 164 contact a baseboard which is secured to a wall, while terminating ends 81 contact the wall as will be described in greater detail below. Further, a strengthening rib 163 may extend from terminating end 166 to prevent deformation and increase overall rigidity.

Middle portion 76 includes a body 88 which may be rounded or semicircular in shape with a bottom surface 160 and filet wall 161 which together define a passage or cavity 168 there between. Bottom surface 160 is used to rest on or contact a top surface of the baseboard, while cavity 168 is open and connects with cavity 86 and cavity 162 such that cable can pass through cavity 162, cavity 168, and cavity 86 to hide the cables within the corner cable conduit transition 70 before moving into another cable conduit.

Corner cable conduit transition 70 may be inserted into corner cable conduit connector 89 within passage or cavity 102 which is formed as part of neck 94. Neck 94 may include a body 96 with a generally rounded shape and a top surface 98 with terminating ends 100 which may also include retaining tabs to retain and secure corner cable conduit transition 70. Corner cable conduit connector 89 may also include a first inlet 90 and a second inlet 92 which may be generally perpendicular to each other, as opposed to the terminating ends of connector 46 which are generally parallel with each other. First inlet 90 includes a rounded body 104, while second inlet 92 includes a rounded body 106 with a connecting portion 108 between bodies 104 and 106 which together define a passage or cavity 124 there between. Cavity 124 also connects with cavity 102 of neck 94 to ultimately connect with cavities 162, 168, and 86. Accordingly, the cavities together provide a pathway for cables to pass through the corner cable conduit transition 70 and corner cable conduit connector 89. First inlet 90 also includes an end wall 112 with terminating ends 114 having retaining tabs 116 and 118. Terminating ends 114 are arranged to couple with a cable conduit and retaining tabs 116 and 118 to secure corner cable conduit connector 89 and the various cable conduits. Second inlet 92 includes an end wall 110 with terminating ends 120 having retaining tabs 122 and 126. Second inlet end wall, terminating ends 120 and retaining tabs 122 and 126 function similar to those same components on first inlet 90 and as such will not be described again.

Throughout the description, cable conduit transitions 20 and 70 have been described as having generally preferred shapes. All components and pieces many have any suitable shape or size, including flat, square, rounded, octagonal, or any other shape that is compatible with the overall appearance of the cable conduit system. Further, the sizes of the cable conduit transitions and various other components may be modified to fit more or less wires or to be used in various different environments. Further, cable conduit transition 20 is generally shown as being a half-circle, but any suitable orientations may be utilized such as any orientation between 15 degrees and 350 degrees to fit along interior or exterior corners or other various shapes. Similarly, corner cable conduit transition 70 is generally shown having a 90 degree semi-circular orientation, but any suitable arrangement between the terminating ends may be implemented to fit various wall and room needs without departing from the spirit and scope of the present disclosure.

Moving to FIG. 3, a portion of an interior room is shown with a floor 130, a first wall 132, a second wall 134, and a corner 136 formed between the two walls. Quarter round cable conduits 138 are positioned adjacent the floor 130 and baseboard 154 and may be connected with closed connectors 150, corner cable conduit transition 70 with corner cable conduit connector 89, open connector 151, and cable conduit transition 20 with cable conduit connector 46. Further, cable conduit transition 20 connects half round cable conduits 144 by inserting one end 146 of the half round cable conduit 144. Cable conduit 144 may also have a rounded body 148. Similarly, quarter round cable conduit 138 includes ends 140 on each side of rounded body 142. Open connector 151 may include opening 152 which can be arranged to receive cable conduit transition 20 or corner cable conduit transition 70. As can be seen, cable conduit transition 20 and corner cable conduit transition 70 are oriented to rest against and over baseboards 154 so that quarter round cable conduits can be positioned on the floor and in the corner of walls. Advantageously, both quarter round cable conduits and half round cable conduits can be connected as a system around and above baseboards while still keeping the wires hidden. Accordingly, cables can pass through any of the quarter round cable conduits 138, half round cable conduits 144, cable conduit transitions 20, corner cable conduit transitions 70, and any other pieces or components described herein.

Both the cable conduit transitions 20 and corner cable conduit transitions 70 may be removably or non-removably secured to cable conduit connectors 46 and corner cable conduit connectors 89. When the cable conduit transitions 20 and corner cable conduit transitions 70 are non-removably secured to the various connectors, the neck of each connector may be welded, secured with adhesive, or formed directly with the connector such that the connector and cable conduit transition or corner cable conduit transition are used as a single piece. Regardless if the connector is removably or non-removably connected to the cable conduit connector or corner cable conduit connector, the appearance and functionality remains the same.

In summary, the disclosed cable conduit transitions provides an easy, efficient, and cheaper alternative way of providing electrical current and low voltage electrical communication to a wall-mounted television or other device without the clutter of cables hanging down the wall. Further cables can be routed along the perimeter of a room to various remote locations.

It will be understood that implementations are not limited to the specific components disclosed herein, as virtually any components consistent with the intended operation of a method and/or system implementation for a cable conduit transition may be utilized. Components may comprise any shape, size, style, type, model, version, class, grade, measurement, concentration, material, weight, quantity, and/or the like consistent with the intended operation of a method and/or system implementation for a cable conduit transition.

The concepts disclosed herein are not limited to the specific implementations shown herein. For example, it is specifically contemplated that the components included in a particular implementation of a cable conduit transition may be formed of any of many different types of materials or combinations that can readily be formed into shaped objects and that are consistent with the intended operation of a cable conduit transition. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, embodiments of the cable conduit transitions may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations of a cable conduit transition, it should be readily apparent that a number of modifications may be made without departing from the spirit thereof and that these implementations may be applied to other cable conduit transitions. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

We claim:

1. A cable conduit transition comprising: a longitudinal axis; a lower portion having a semicircular shape around the longitudinal axis and two lower portion terminating ends; an upper portion having a semicircular shape around the longitudinal axis and two upper portion terminating ends; and, wherein the two lower portion terminating ends and a bottom wall of a middle portion oriented between the lower portion and the upper portion abut a baseboard, and wherein the two lower portion terminating ends are offset from and parallel to the two upper portion terminating ends.

2. The cable conduit transition of claim 1 wherein the two lower portion terminating ends and the two upper portion terminating ends are oriented approximately 180 degrees apart.

3. The cable conduit transition of claim 1 wherein the two lower portion terminating ends and the two upper portion terminating ends are oriented approximately 90 degrees apart.

4. The cable conduit transition of claim 1 wherein the two upper portion terminating ends further comprise retaining tabs.

5. The cable conduit transition of claim 1 further comprising a middle portion having a spherical shape and connecting the upper portion and the lower portion.

6. The cable conduit transition of claim 5 wherein the lower portion, the upper portion, and the middle portion together define a passage.

7. The cable conduit transition of claim 1 wherein the two upper portion terminating ends abut a wall.

8. The cable conduit transition of claim 1 wherein the upper portion surrounds a cable conduit.

9. The cable conduit transition of claim 8 wherein the two upper portion terminating ends further comprise retaining tabs and the retaining tabs engage the cable conduit.

10. The cable conduit transition of claim 8 wherein the upper portion removably surrounds the cable conduit.

11. The cable conduit transition of claim 1 further comprising a cable conduit connector connecting at least two cable conduits.

12. The cable conduit transition of claim 11 wherein the cable conduit connector further comprises a neck.

13. The cable conduit transition of claim 12 wherein the lower portion is removably positioned within the neck.

14. The cable conduit transition of claim 11 wherein the cable conduit connector further comprises a plurality of retaining tabs.

15. The cable conduit transition of claim 12 wherein the lower portion is inserted into the neck until a middle portion contacts a baseboard.

16. The cable conduit transition of 11 wherein the cable conduit connector further comprises a first inlet and a second inlet.

17. The cable conduit transition of claim 16 wherein the first inlet is oriented generally perpendicular to the second inlet.

18. The cable conduit transition of claim 16 wherein the first inlet is oriented parallel to the second inlet.

19. The cable conduit transition of claim 11 wherein the cable conduit connector is non-removably connected to the cable conduit transition.

* * * * *